United States Patent Office 2,720,108
Patented Oct. 11, 1955

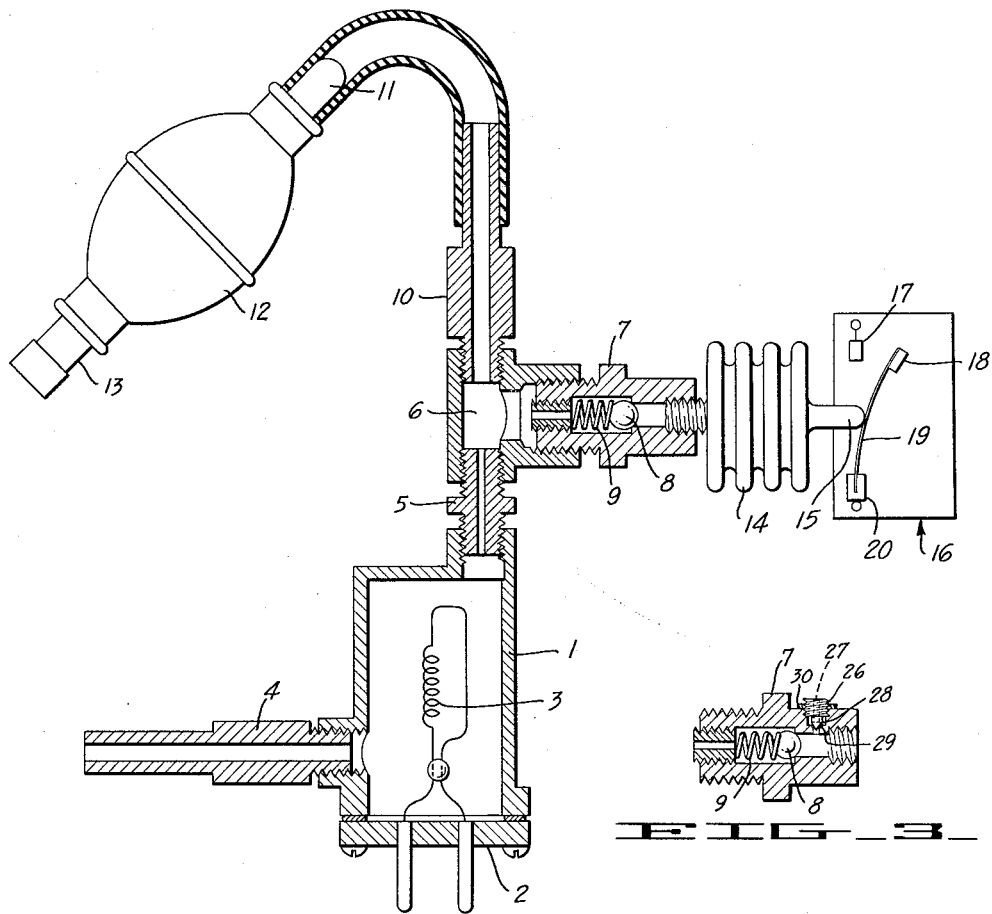
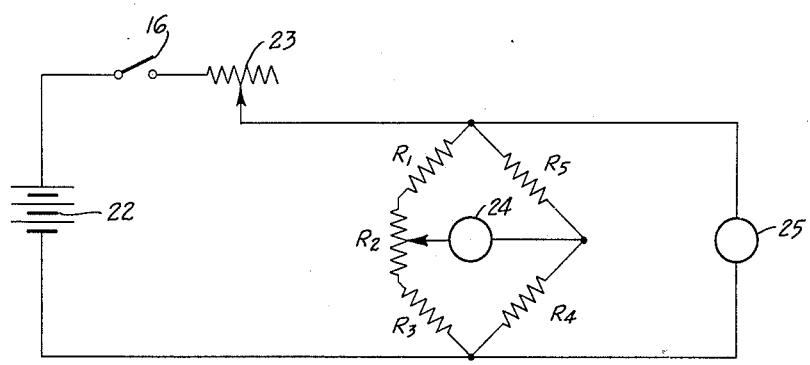

2,720,108

GAS ANALYSIS APPARATUS

Kenneth W. Johnson, Palo Alto, Calif., assignor to Johnson-Williams, Inc., a corporation of California Application July 28, 1953, Serial No. 370,714

4 Claims. (Cl. 73—27)

This invention relates to apparatus for measuring the concentration of vapors in the atmosphere. The invention is particularly adapted to that class of portable apparatus in which a gaseous sample is brought into contact with a hot wire for the purpose of affecting the temperature and electrical resistance of said wire, such change in resistance being related to the concentration of gas or vapor to be determined. However, as will be later apparent, the invention is readily adapted to many different types of gas analysis apparatus. Two typical instruments of the hot-wire type to which this invention might be applied are those instruments known as combustible gas indicators or flammable vapor detectors, in which the change in resistance is effected by catalytic combustion on or near the surface of a catalyst, such as a wire of the platinum metals group, and those instruments known as thermal conductivity gas analyzers, in which the resistance of the hot wire is affected by variations in thermal conductivity of the gaseous sample.

Instruments of the types cited above have been in use for many years, but their utility and reliability have been limited by the life of the batteries used to furnish the current for heating the sensing wire and for providing the indication, usually on a sensitive galvanometer. The life of the battery is relatively short due to the heavy current drain which must be taken from the dry cells (usually of the order of one ampere) and the reliability of the instrument is affected by the rapid change in terminal voltage observed as the battery is consumed, as will be familiar to those skilled in the art. Said change in terminal voltage affects the current passing through the measuring wire, which may in turn affect the initial balance and the sensitivity of the electrical measuring circuits, since it will be understood that there is only one ideal operating voltage and current for any given instrument while testing a given type of sample.

It is well-known that the actual time required for completion of a test with one of these instruments is very short, and that the greater part of the battery drain occurs between tests, due to failure of the operator to turn off the switch, either through forgetfulness or due to the inconvenience of repeatedly having to turn the instrument on and off.

It is an object of this invention to prolong the life of the battery, as used in instruments of the type described above, by providing a switch which will automatically turn on a battery or other current when needed, and will turn it off at the completion of the test without the necessity of manual operation by the user.

It is a further object of this invention to improve the accuracy and reliability of such instruments by provision of such automatic shut-off, to prevent large changes in the operating voltage and current during testing, due to failure of the operator to shut the instrument off between readings.

Still another object is to prevent damage to the instrument case and internal parts by corrosion from discharged dry cells, due to failure of the operator to shut off the current at the completion of testing.

Still another object is to increase the life of the hot wire sensitive element by limiting its energization to those periods when it is actually in use.

In view of the above, it will be understood that my invention includes the use of an automatic switch which turns on the current in the instrument at the beginning of a test, and which turns off the current at the end of a test or within a reasonable or predetermined time thereafter, such switch being actuated by the act of passing the sample through the instrument, as will be apparent from the following detailed illustration and description.

Referring to the drawings:

Figure 1 is a vertical view, partly in section, of the sampling system of an apparatus embodying the invention, and Figure 2 is an electrical circuit diagram of an instrument employing the invention.

Figure 3 is a detailed view of one portion of a modification of the apparatus of Figure 1.

Referring to the drawing by reference characters, a chamber 1 is provided with a base 2 and a gas inlet tube 4. Located within chamber 1 is a filament 3, together with the usual base and support wires. An outlet 5 is provided which is of small diameter. The outlet 5 leads to chamber 6 which in turn leads to a ball check valve, generally designated 7. The valve 7 has a spring 9 and a ball 8 therein, the spring 9 seating the ball 8 against the shoulder of the valve, as is shown. Also connected with the chamber 6 is a tube 10 which leads to an aspirator bulb 12. The bulb 12 is equipped with valves 11 and 13 which operate in the usual manner, so that as the bulb is squeezed and released, gas is drawn in through the tube 4.

It will be understood that any other type of suction device could be used in place of the bulb 12, provided only that it furnishes a source of vacuum tending to draw sample into the system.

The equipment thus far described, with the exception of the check valve, has been used for many years in instruments of the type under consideration, and is familiar to those skilled in the art.

My invention consists of the automatic switch equipment contained in the right-hand side of Figure 1 of the drawing, and its application to the type of instrument in question. The check valve 7 connects the interior of the sample system at 6 with the interior of the metal bellows 14. Vacuum in the interior of connector 6 causes check ball 8, held against its seat by the spring 9, to lift, permitting some of the atmosphere in the interior of bellows 14 to be drawn out through 7, and causing the free right-hand end of the bellows to move to the left. It will be noted that the tubes 4 and 10 are of relatively large diameter as compared to the constricted tube 5.

Connected to the tip 15 of the bellows 14 is a switch generally designated 16. The switch 16 has a fixed contact 17 and a movable contact 18, the contact 18 being supported by a spring arm 19. The action of the spring arm 19 is such that it tends to keep the switch closed, establishing a circuit between the points 17 and 20 of the switch. However, the bellows 14 is stiff enough to overcome the action of the spring 19 and to keep the switch open when the atmosphere within the bellows is at the same pressure as that of the atmosphere surrounding the bellows.

As the bulb 12 is actuated, a partial pulsating vacuum is produced within the chamber 6 which, in turn, causes the bellows 14 to contract, closing the switch 16. The action of the ball check valve is such that the vacuum is maintained in the bellows 14 for some time after the bulb 12 has been actuated. However, after a lapse of time, the air will slowly leak past the valve 7 into the bellows 14, which will restore the switch 16 to the open position. If desired, an adjustable leak from the outside atmosphere to the interior of the bellows may be provided to control the time required for the switch to open. In Figure 3, one form of construction for such a check valve 7 is indicated, in which a small adjustable needle valve is provided for adjustment of air leakage back into bellows 14. With needle 26 screwed all the way in, the needle point 28 seals against its seat 29, and unscrewing needle 26 will permit adjustment of the rate at which air enters through drilled passage 27, past seat 29 and into the interior of the bellows. Locknut 30 prevents accidental change in adjustment of needle 26.

The ideal time for return of the switch to its open position will depend upon the exact service to which my invention will be applied. The time will normally be in the range of 10 seconds to two minutes, and must be sufficiently long to permit reading the instrument after cessation of pumping.

Figure 2 illustrates a typical electrical circuit which may be used in conjunction with my invention. The batteries 22 provide current, through switch 16 and rheostat 23 to the Wheatstone bridge circuit formed by $R_1$, $R_2$, $R_3$, $R_4$, and measuring wire 3, which is designated $R_5$ in Figure 2. The Wheatstone bridge balance is effected by potentiometer $R_2$, and indicated on indicator meter 24. The operating voltage to be maintained is indicated on voltmeter 25 and is regulated by rheostat 23. The action of gas on the sample causes the resistance of $R_5$ to change, unbalancing the bridge in an amount proportional to the percentage of gas in the sample, as indicated on meter 24.

In operation, inlet 4 is connected to a source of known sample, and the suction device 12 is operated, flushing the interior of the sampling system with the known sample. Switch 16 automatically closes, as described above, and remains closed for a sufficient time to permit adjustment of 23 and $R_2$ to give the desired readings on 24 and 25, respectively.

After the above initial adjustments have been completed, the device will automatically shut itself off. To make a test on an unknown sample, it is only necessary to connect the inlet 4 to the source of sample and to operate the suction device 12. Switch 16 will automatically close, energizing the electrical circuit and permitting the instrument to operate to indicate on meter 24 the concentration of gas or vapor in the unknown sample, in appropriate terms. After completion of the test, the switch 16 automatically is opened, disconnecting the batteries 22 from the circuit.

It will be understood that many variations are possible in the electrical circuit and the design of the sampling system used in such instruments, and that I do not wish to be restricted to the construction indicated in the preferred embodiment described above, but rather my invention is defined in the claims which are appended.

It should also be understood that my invention will operate equally well if a pressure device is applied at 12 to force a sample through the sampling system, it only being necessary to reverse the check valve 7 and the switch 16 in such a manner as to permit switch 16 to be operated by extension rather than contraction of bellows 14. It will also be apparent that other pressure-sensitive devices might be substituted for bellows 14, as for example a diaphragm, or a piston in a cylinder.

I claim:

1. In a gas analysis apparatus, an electric circuit for energizing said analysis apparatus, vacuum means for drawing a gas sample into a chamber for analysis, a vacuum operated switch whereby the electric circuit is closed upon actuation of the vacuum means, and a check valve between said vacuum operated switch and said vacuum means, and means for slowly bleeding air into said vacuum operated switch whereby the switch will be opened after a lapse of time.

2. In an electric gas analysis apparatus of the hot wire type having a suction or pressure actuated component as a sampling means, means for automatically energizing and de-energizing the electrical circuit, consisting of a pressure-sensitive element, an electrical switch operated by said pressure-sensitive element, a check valve connected to said pressure sensitive element and means whereby said check valve will slowly bleed, reversing the action of said switch after a lapse of time.

3. In an electric gas analysis apparatus of the hot wire type having a sampling system wherein the gas pressure changes when a sample is taken, means for automatically energizing and de-energizing the electrical circuit consisting of a flexible metallic bellows connected to the sampling system through a check valve, the free end of said bellows actuating a switch to turn on the electrical circuit when a sample is taken and a bleeder on said check valve whereby said switch is turned off after a lapse of time.

4. In an electric, combustible gas detecting instrument having a sampling chamber of the catalytic combustion type into which the sample is introduced by pressure changing means, means for preventing unnecessary discharge of the battery consisting of a pressure-sensitive element connected to the sampling system and actuated by pressure variations therein having a slow bleeding check valve, and a switch operated by said pressure-sensitive element, which connects the electrical circuit when sampling is commenced, and disconnects the electrical circuit after a lapse of time.

References Cited in the file of this patent

UNITED STATES PATENTS

| | | |
|---|---|---|
| 1,633,521 | Edwards | June 21, 1927 |
| 2,033,417 | Dezotell | Mar. 10, 1936 |
| 2,149,441 | Jacobson | Mar. 7, 1939 |
| 2,539,452 | Mapes | Jan. 30, 1951 |
| 2,685,204 | Dietz | Aug. 3, 1954 |